United States Patent [19]
Golben

[11] Patent Number: 5,532,074
[45] Date of Patent: Jul. 2, 1996

[54] SEGMENTED HYDRIDE BATTERY

[75] Inventor: P. Mark Golben, Florida, N.Y.

[73] Assignee: Ergenics, Inc., Ringwood, N.J.

[21] Appl. No.: 267,038

[22] Filed: Jun. 27, 1994

[51] Int. Cl.[6] ................................................. H01M 10/52
[52] U.S. Cl. .................. 429/53; 429/58; 429/94; 429/101
[58] Field of Search ............................. 429/101, 53, 58, 429/94; 204/246, 277

[56] References Cited

U.S. PATENT DOCUMENTS

| | | | |
|---|---|---|---|
| 4,343,770 | 8/1982 | Simons | 422/112 |
| 4,396,114 | 8/1983 | Golben et al. | 206/0.7 |
| 4,434,214 | 2/1984 | Syzuki | 429/94 X |
| 4,439,500 | 3/1984 | Gibbard et al. | 429/53 X |
| 4,710,278 | 12/1987 | Polak et al. | 204/129 |
| 4,885,218 | 12/1989 | Andoy et al. | 429/53 |
| 5,047,301 | 9/1991 | Adlhart et al. | 429/101 |
| 5,250,368 | 10/1993 | Golben et al. | 429/17 |
| 5,264,301 | 11/1993 | Sindorf et al. | 429/101 X |

Primary Examiner—Stephen Kalafut
Attorney, Agent, or Firm—Dorn, McEachran, Jambor & Keating; Vangelis Economou

[57] ABSTRACT

An apparatus for and method of storing hydrogen gas within an enclosed metal hydride container that is isolated from an apparatus which uses hydrogen gas, including a constricted opening having a valve to selectively open or close the hydrogen gas communication between the hydrogen storage container and the apparatus using the hydrogen. Also included within the hydrogen gas communication between the storage and use is a filter for filtering out oxygen and water vapor molecules from the hydrogen stream passing from the apparatus using the hydrogen to the hydrogen storage metal hydride. The filter means comprises a thin metal disc or a hydrogen gas permeable elastomeric thin film coating, such as a polyethylene resin or silicone oil, either in the hydrogen stream path or as a coating on each of the hydrogen absorbing metal hydride particles which are disposed within the hydrogen storage chamber. The enclosed metal hydride container may be disposed either within the apparatus using the hydrogen gas or externally thereof.

19 Claims, 3 Drawing Sheets

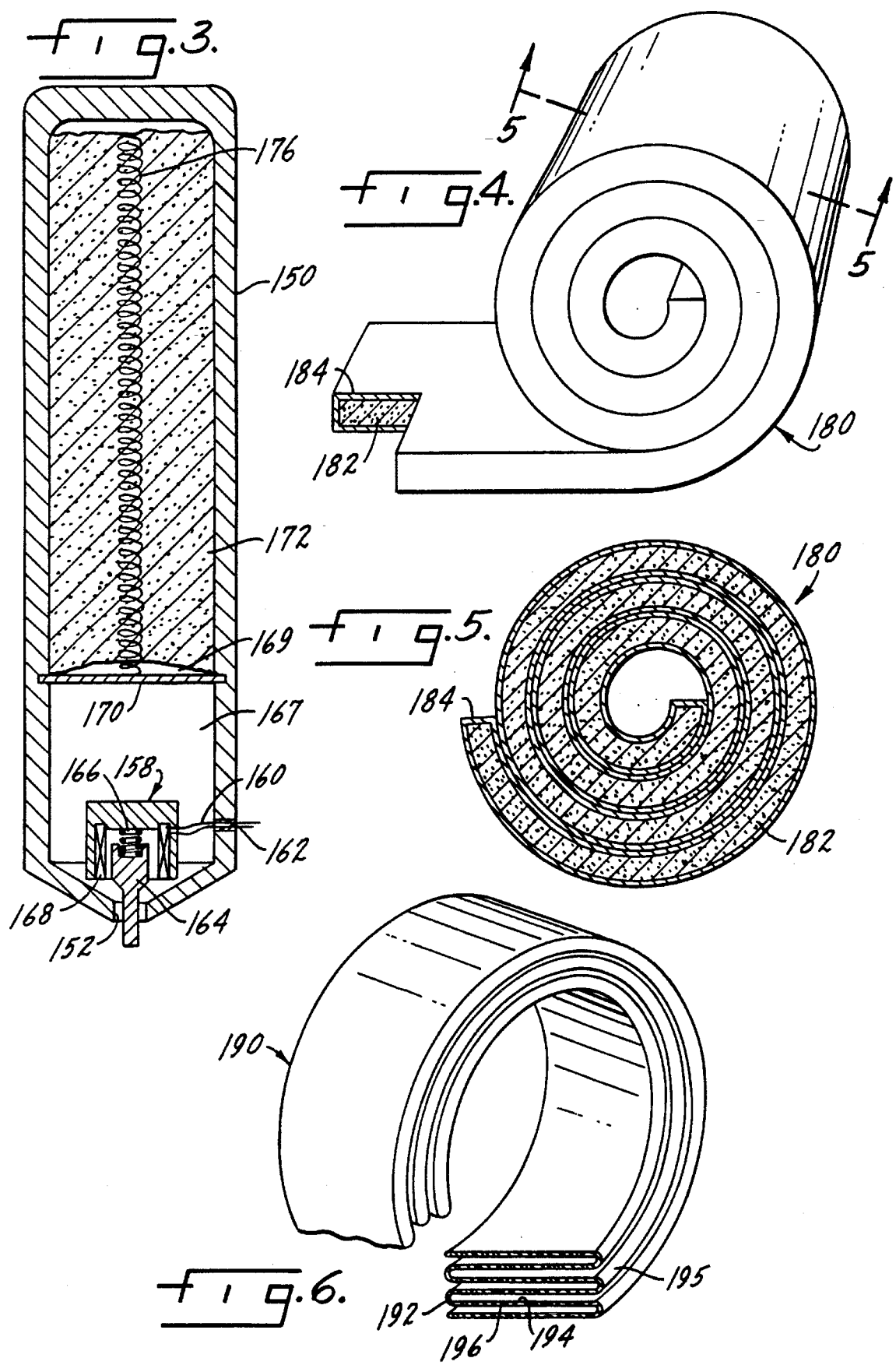

SEGMENTED HYDRIDE BATTERY

BACKGROUND OF THE INVENTION

1. Field of the Invention

The present invention relates generally to metal hydride batteries and more specifically, relates to metal hydride batteries including a hydrogen storage capacity which provides for passive purification of a hydrogen gas stream to remove water vapor and oxygen entrained within the hydrogen gas.

2. Background Art

Metal hydride electromechanical fuel cells are in series consideration as the next generation power source for providing power to automotive and other zero emission locomotive uses. Several innovative techniques have been described for obtaining electrical power from electrochemical cells utilizing the combining reaction of hydrogen with oxygen to produce water. One classification of these techniques is between reversible and irreversible reactions.

Irreversible reactions provide a supply of hydrogen, usually in gas form, to an electrochemical cell which utilizes the combining reaction to produce an electrical potential and water as a byproduct. These types of cells utilize stored hydrogen to produce water which is then wicked or siphoned off from the system. An example of this type of electrochemical system may be found in a vehicle commonly referred to as the "Ballard bus". A variation of an irreversible system is also described in U.S. Pat. No. 4,826,741. The hydrogen is not stored as a gas under pressure, but is stored within a metal hydride material removed and separate from the electrochemical cell.

One drawback to the irreversible systems is that fresh hydrogen must be continually supplied to the system in order to continue the operation of the electrochemical cell. A means must be included for removing and disposing of the water which is a by-product of the invention. Another drawback to the irreversible systems is that the battery of cells is not rechargeable, that is, the chemical reaction producing water cannot be reversed by providing an electrical potential and thereby regenerating the constituent hydrogen and oxygen molecules for later use in electrical power production by the electrochemical cell.

Reversible electrochemical cell systems have also been described. These systems provide for a reversibility of the chemical reaction that produces water. The reverse reaction will generally utilize an electrical load having reversed polarity and being attached to the terminals. The electrical load recharges the battery by hydrolyzing water into its constituent molecules of hydrogen and oxygen. The hydrogen enters a gas phase and must then be stored for further use during the discharge mode of the battery.

Generally, nickel hydrogen batteries have relied upon a high pressure storage vessel for hydrogen gas which is used as a source of supply to produce electrical power from the electrochemical cells. Such devices require a massive, bulky and rigid outer shell which can withstand high internal pressures. High pressure gas storage has been considered necessary in order to make possible sufficient hydrogen storage capacity for continued operation of these devices. Examples of these devices are disclosed in U.S. Pat. Nos. 5,082,754, and 5,162,171.

Hydrogen storage technology has progressed to enable storage of hydrogen at lower pressures in a vessel so as to provide low pressure delivery of hydrogen gas to a nickel-hydroxide/hydrogen battery with which the storage vessel is associated. For example, a low pressure hydrogen storage system is disclosed in U.S. Pat. No. 3,850,694, issued to Dunlop et al, in U.S. Pat. No. 4,395,469 issued to Fritts, and in U.S. Pat. No. 5,250,368 issued to Golben et al.

The effective operation of metal hydride battery and storage systems at low pressures is significant because it leads directly to further refinements in the construction and use of metal hydride batteries. U.S. Pat. No. 5,419,981, invented by the inventor of the present invention, describes a further refinement in the metal hydride battery which becomes possible from the ability to use low pressure storage and low pressure hydrogen during battery operation. That refinement provides for a battery having modular construction, and for lower hydrogen pressure which allows O-ring sealing between the outer containment can portions of each module. The disclosure of U.S. Pat. No. 5,419,981 is incorporated herein by reference.

The device described in U.S. Pat. No. 5,250,368 utilizes remote hydrogen storage facilities providing a hydrogen storage vessel which is isolated from the metal hydride battery cells where the electrochemical reaction provides electrical power. An interconnecting fluid communication means, such as a pipe or other conduit, provides a reversible pathway for a hydrogen stream to flow between the storage vessel and the metal hydride battery.

Separate and isolated facilities have been considered necessary to inhibit or essentially eliminate the deterioration of various elements of a hydrogen battery/storage system which results from repeated charge/discharge of the system. The cycle includes hydrogen discharging from the storage vessel to the battery for producing electricity when an electrical load is connected. When an external electrical power source is connected, the cycle charges the system by returning the hydrogen from the battery cells to the storage vessel.

Aforementioned U.S. Pat. No. 5,250,368 describes the process by which deterioration of metal hydride material occurs, and provides a system and method for purifying the hydrogen stream in order to extend the cycle life of the battery system. The improved system and method disclosed in U.S. Pat. No. 5,250,368 and assigned together with this invention to a common assignee, actively purifies the hydrogen stream of entrained oxygen and water vapor. The description found in U.S. Pat. No. 5,250,368 is incorporated herein by reference.

U.S. Pat. No. 4,343,770 describes a segmented hydrogen storage tank containing a metal hydride hydrogen storage material and providing for a hydrogen gas stream communication between an element which utilizes hydrogen as a fuel, such as an internal combustion engine utilizing gaseous hydrogen as a fuel. A dual purpose in-line hydrogen "filter unit", is in flow communication with the hydrogen storage tank. The filter unit has a porous bed of catalyst material, such as platinum, palladium or nickel, which is capable of converting oxygen in the presence of hydrogen to water. A second section is capable of adsorbing water and water vapor from the hydrogen stream and can comprise a molecular sieve, alumina, charcoal and silica gel. The system described is usable for higher pressure for the hydrogen gas stream up to 1000 psi.

Another distinction arises within the types of reversible metal hydride fuel cells which distinction depends on how the metal hydride is utilized within the relevant system. One type of reversible battery provides a metal hydride used as an anode, and utilizing hydrogen stored within the anode for the electrochemical reaction to produce an electric charge. This type of battery is known as a nickel-metal hydride battery and the reversible electrochemical reaction proceeds as follows:

Metal Hydride (MH) Negative Electrode:

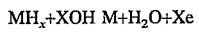

$MH_x + XOH \rightleftharpoons M + H_2O + Xe$

Positive Electrode:

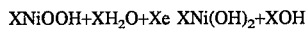

$XNiOOH + XH_2O + Xe \rightleftharpoons XNi(OH)_2 + XOH$

An inert, hydrophilic material partially saturated with an appropriate electrolyte or a polymer membane which is susceptible to ion transmission, but is itself an electrical insulator, separates the positive and negative electrodes to avoid short circuits but nevertheless permits of the hydroxyl ion (OH⁻) traverse from the anode to the cathode. An effective material for the separator may be a known ionic exchange membrane, such as NAFION, manufactured by E. I. dupont de Nemours, and located in Wilmington, Del. Use of a NAFION ion exchange membrane is described in U.S. Pat. No. 4,175,165. Alternatively, a membrane having a basic ion exchange mechanism, such as fiberglass, Nylon, polypropylene or zirconia cloth, soaked in a potassium hydroxide solution, may be used for the separatore plate.

The reaction and use of an ion exchange membrane are known, and further details of the reaction may be had by reference to any of several U.S. Patents, such as U.S. Pat. No. 4,826,741, and U.S. Pat. No. 4,699,856. Of course, since the reaction is reversible, as shown by the arrows pointing in both directions, the reverse reaction charges the battery and produces atomic or molecular hydrogen which is again re-absorbed in the metal hydride anode.

A different type of electrochemical cell, known as a nickel-hydrogen battery, is used in which the anode effectively comprises a catalyst at which hydrogen gas is first split into monatomic hydrogen and ionized, and the hydrogen ion then reacts with the hydroxyl ions to drive the reaction, thereby producing water. The reaction at the positive electrode provides a hydroxyl ion which passes through a membrane separator to the negative electrode where it reacts with the hydrogen ion. The full reaction is set forth in the aforementioned Dunlop U.S. Pat. No. 3,850,694, which has been incorporated by reference.

Nickel-hydrogen batteries are different in several respects from nickel-metal hydride batteries. In the nickel-metal hydride battery example, the hydrogen is stored in solid form within the metal hydride negative electrode. The stored hydrogen is always available to run the reaction, and the only impediment to full discharge of such a battery is the lack of connection to an electrical load outside the battery. These types of batteries are subject to self-discharge, because a potential is always present at the battery terminals, and ionic particles in the environment draw down the power stored within these types of batteries.

Conversely, nickel-hydrogen batteries require a steady supply of gaseous hydrogen to provide hydrogen ions to run the electrochemical reaction. In the absence of hydrogen gas to run the reaction at the anode, the electrical potential soon dissipates after an equilibrium condition in the reversible reaction is achieved. At equilibrium, the battery may nevertheless continue to store hydrogen, and also store electrical power, if a separation between the hydrogen storage vessel and the electrochemical cells is maintained. In this way, self discharge of the battery is avoided.

Another difference between these two classes of batteries is that the nickel-metal hydride battery provides direct contact between the electrolyte separator and the metal hydride negative electrode. Introduction of the hydroxyl ions through the membrane separator permits oxygen to come into contact with the metal hydride. This is generally detrimental to the metal hydride because metal hydride materials are known to be good absorbers of oxygen as well as of hydrogen. There is a disincentive to permit oxygen absorption in the metal hydride because the oxygen impedes continued and effective absorption of hydrogen, and over a period of continued cycling, enough oxygen absorption can render the metal hydride incapable of storing sufficient hydrogen for efficient production of electric charge.

A key consideration in avoiding material deterioration or decomposition of the system elements is the elimination of impurities, such as oxygen or water vapor, from the hydrogen gas being delivered to the metal hydride storage material. Various methods have been proposed tending to inhibit or eliminate contact of oxygen or water vapor with the metal hydride electrode. U.S. Pat. No. 4,952,465 describes use of a metal hydride additive to electrodes of an alkaline energy storage device. The additive may be disposed on or between the electrodes of the alkaline energy storage device so as to absorb hydrogen and re-combine oxygen, thus reducing hydrogen and oxygen gas pressure in a sealed energy storage device and also avoiding the deterioration of the electrodes.

U.S. Pat. No. 5,128,219 also describes an electrode protection mechanism for inhibiting contact of the metal hydride, hydrogen storing negative electrode with oxygen formed during the electrolytic reaction. The mechanism includes galvanically coating metal hydride particles with a thin film of a metal, such as palladium, nickel or copper. Choosing the appropriate combination of metals having an appropriate thickness provides a "filter" which ideally is permeable to hydrogen but which inhibits passage of the larger oxygen molecules/ions from outside of the coating into contact with the encased metal hydride particles. The metal hydride particles are coated before the particles are pressed together to provide a solid metal hydride electrode.

These methods of preventing oxygen contamination of a metal hydride electrode for hydrogen storage in an electrode. However, the process for uniformly coating the individual metal hydride particles with a metal coating is expensive for the large metal hydride quantities needed for use in a metal hydride hydrogen storage battery system.

Nickel-hydrogen batteries normally provide a storage capacity for hydrogen which is separate and removed from the electrochemical cells. The storage may be in hydrogen tanks as in the aforementioned Ballard bus, or in a segmented metal hydride vessel, such as in U.S. Pat. No. 5,250,368. An advantage provided by nickel-hydrogen batteries is that contact between the hydroxyl ions and the metal hydride can be avoided by the physical separation of the metal hydride from the electrochemical cells. Nevertheless, even when isolated from each other, the electrochemical reaction in the cells produces sufficient water vapor that becomes entrained in the hydrogen stream that the water vapor reaches the metal hydride and releases the oxygen atoms which are absorbed into the metal hydride. Thus, a means is necessary to inhibit or eliminate water vapor and/or oxygen from coming into contact with the metal hydride.

U.S. Pat. No. 5,250,368 proposes not only isolating the metal hydride in a separate vessel, but including elements in an in-line piping network between the hydride storage vessel and the electrochemical cell chamber, which elements actively purify and filter out the entrained water vapor and oxygen from the hydrogen stream. This method is operational and has been demonstrated to provide a significant increase in the number of charge/discharge cycles through which the battery system may be subjected before hydrogen storage capability appreciably deteriorates. Nevertheless, the active elements of the system utilize electrical power which in smaller systems may render the electricity storing capability inefficient.

An exception to the separate or segmented storage of the hydrogen storing metal hydride material, isolated from the electrochemical cells, can be found in the aforementioned Dunlop U.S. Pat. No. 3,850,694. Dunlop proposes a thin film of Teflon using a metal hydride layer for storing hydrogen within the chamber also containing the electrochemical cells. The Teflon is described as providing a hydrophobic surface allowing hydrogen gas passage and inhibiting water vapor or KOH from reaching the metal hydride storage means. However, the device taught by Dunlop in U.S. Pat. No. 3,850,694 does not have an isolation of the hydrogen storage means from the electrochemical cells, and thus is also susceptible to self-discharge, as described above.

A method and apparatus for separation and purification of hydrogen from a gaseous mixture, comprising a thin film membrane made of heteropoly acids and salts thereof is taught in U.S. Pat. No. 4,710,278. A catalytic agent such as nickel, platinum, palladium, or alloys thereof may be disposed on either side of the thin film membrane for promotion of the dissociation and combination of the hydrogen gases on the respective sides of the membrane.

What is considered necessary to efficient and controlled electrical discharge is a metal-hydrogen battery in which the hydrogen storage means is isolated from the electrochemical cells to avoid self-discharge and also to provide control of when the charged battery begins to provide electrical power.

SUMMARY OF THE INVENTION

Accordingly, this invention describes and claims a segmented, metal hydride battery system comprising a containment can, a stack of hydrogen-metal oxide cells, defining a hydrogen-metal oxide battery, disposed within the containment can, each cell comprising at least a positive and a negative electrode, a hermetically enclosed, hydrogen storage vessel containing a metal hydride material for retaining and storing a concentrated volume of hydrogen, the metal hydride material being capable of releasably absorbing and discharging gaseous hydrogen, a communication means disposed between the hydrogen-metal oxide battery, and the enclosed hydrogen storage vessel for permitting a reversible communication of a hydrogen gas stream flow between them, a means for selectively opening and closing the communication means to permit and restrict hydrogen gas flow between the hydrogen battery and the enclosed hydrogen storage vessel and a filter comprising a thin film material disposed in the hydrogen gas stream flow between the hydrogen battery and the enclosed metal hydride material, the filter being capable of diffusing hydrogen therethrough but being essentially impervious to oxygen and other large gas molecules, the filter providing an effective enclosure for inhibiting oxygen and other large molecules from reaching the metal hydride, hydrogen storage material.

BRIEF DESCRIPTION OF THE DRAWING

FIG. 3 illustrates a cross-sectional elevational view of a detail of the inventive metal hydride storage vessel shown in FIG. 2.

FIG. 4 is a perspective view, in partial cross-section of an alternative metal hydride storage element which may be used with an embodiment of this invention.

FIG. 5 is a cross-sectional view of the metal hydride storage member shown in FIG. 4 taken approximately along the line 5—5.

FIG. 6 illustrates an alternative embodiment of a metal hydride storage element used with a battery system embodiment of this invention.

DETAILED DESCRIPTION OF THE PREFERRED EMBODIMENTS

Figure 1:
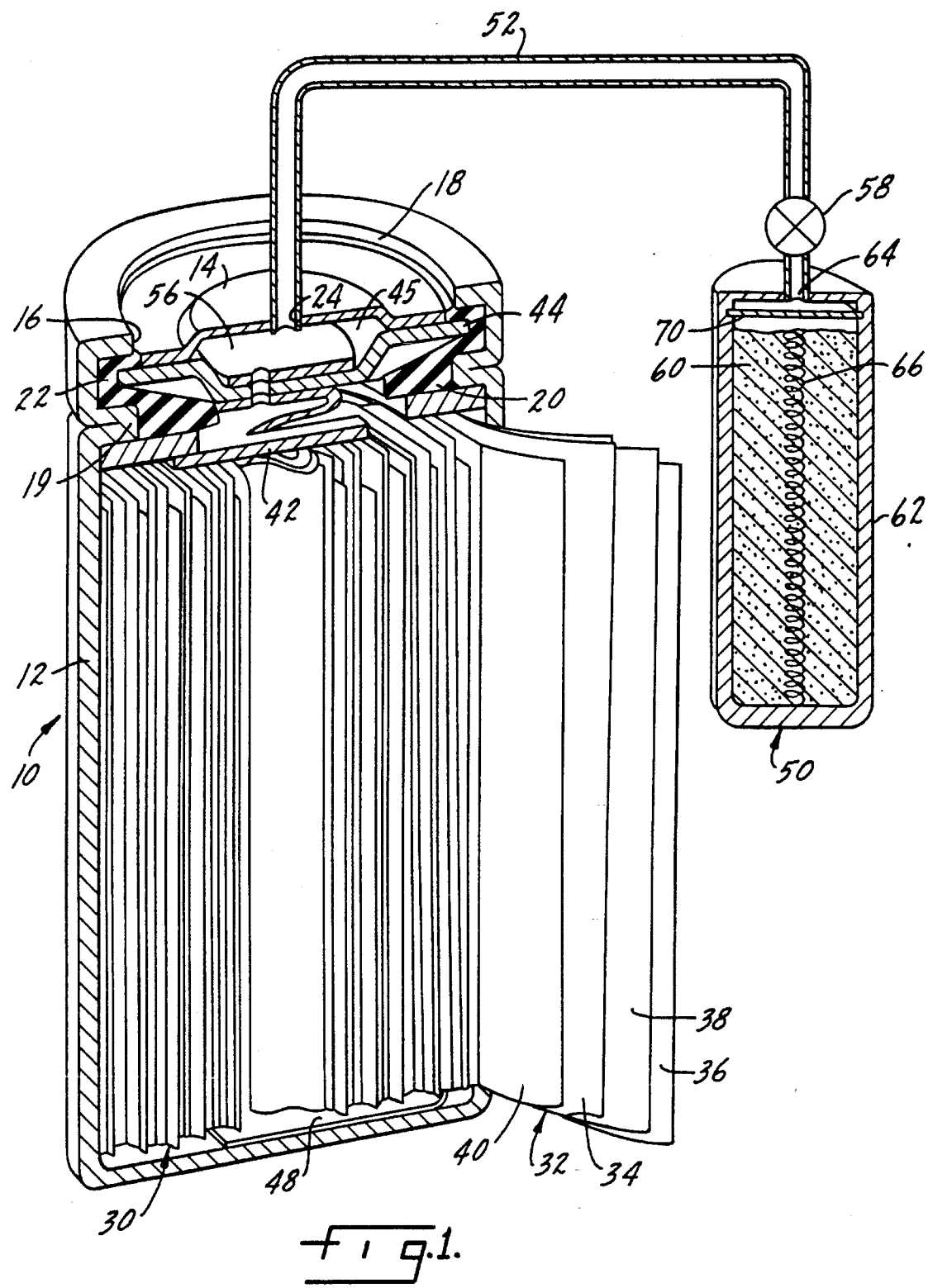
FIG. 1 is a cross-sectional perspective view of a metal hydride battery according to this invention.
Figure 2:
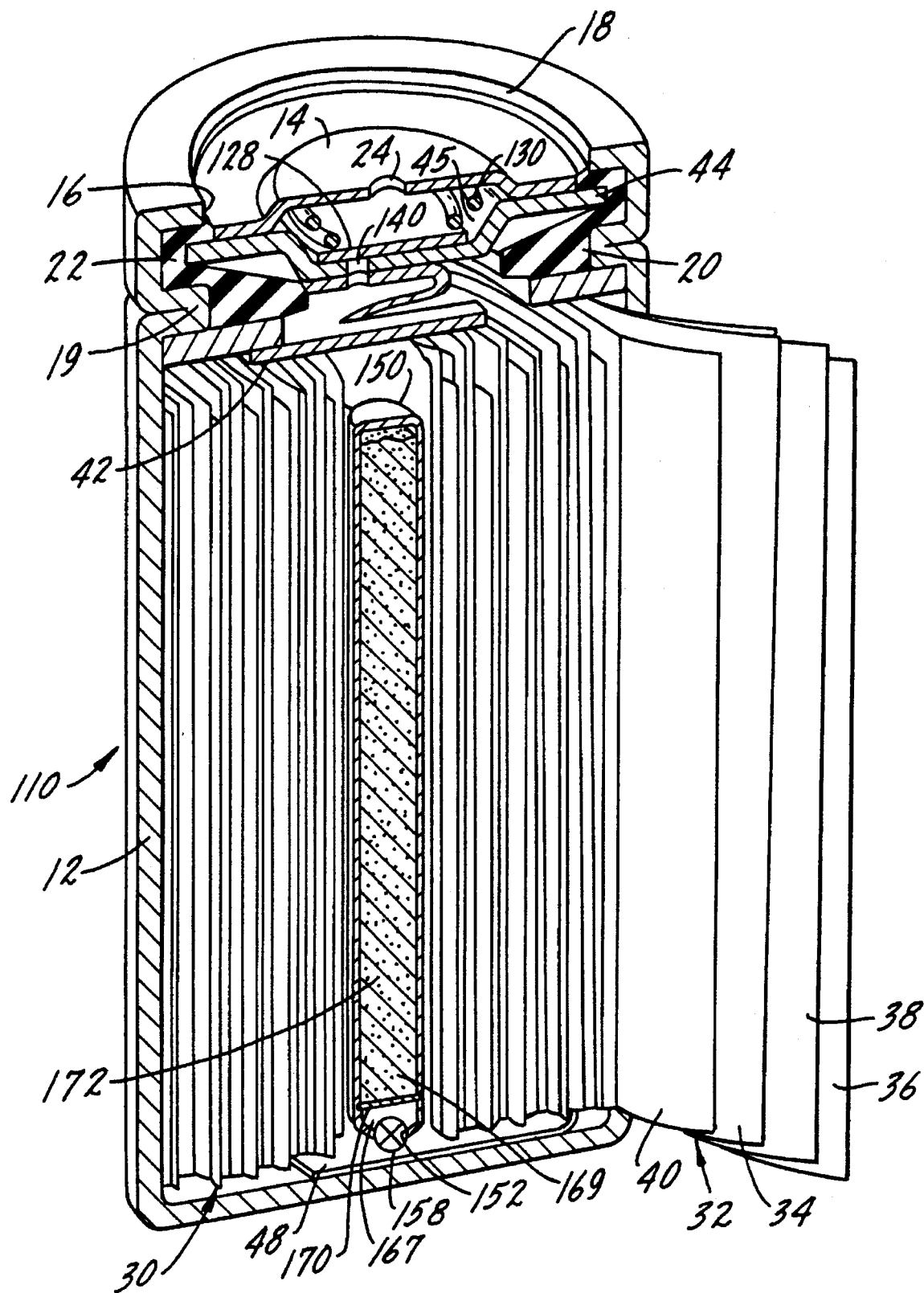
FIG. 2 illustrates in a cross-sectional perspective view an alternative embodiment of a metal hydride battery according to this invention.

The metal hydride battery system according to this invention is illustrated in FIG. 1. It is in many respects similar in structure to the alternative embodiment of an inventive system that is illustrated in FIG. 2. Therefore, identical elements in each of the two devices shown in FIGS. 1 and 2 will be identified by identical reference numerals. The devices of FIGS. 1 and 2 will be described together in this description as far as the description relates to similar structure. A separate discussions of the two alternative devices will be set forth in discussing dissimilar elements.

FIGS. 1 and 2 generally each illustrate different embodiments of the inventive metal hydride battery. FIG. 1 illustrates a metal hydride battery system 10 wherein the battery is removed and isolated from the metal hydride hydrogen storage vessel. The segmented metal hydride battery system 10 is similar in the isolated element construction to that illustrated described in above mentioned U.S. Pat. Nos. 5,047,301 and 5,250,368. FIG. 2 illustrates a battery system 110 according to an alternative embodiment of the present invention where the metal hydride hydrogen storage vessel is enclosed within the battery compartment.

Each device 10, 110 preferably comprises a nickel plated steel case or containment can 12 having a substantially cup-shaped form which together with a cover 14 sealed to the can 12 provides a gas-tight enclosure for the contents within the can 12. The containment can 12 has a top end that includes an opening 16, preferably having a circular shape. The opening 16 is preferably circular and is surrounded by a radially extending lip 18 which, together with an undulation 19, forms a crimp for an elastomeric sealing plug 20. The plug 20 at an outer periphery includes a lateral edge 22 which is disposed between the lip 18 and the radially extending undulation 19, so that when the lip 18 is crimped over the lateral edge 22, a seal is formed between them.

The cover 14 is positioned within the opening 16, and is preferably made of a suitable metal to provide a positive terminal for the battery. The nickel plated steel containment can 12 preferably provides the negative terminal for the battery 10.

The elastomeric plug 20 can seal against the cover 14 to provide an air-tight, sealed container with the containment can 12. Cover 14 has an aperture 24 centrally located which may provide a means for hydrogen passage bleed-down to reduce pressure or may be connected to a hydrogen passage means as will be explained below.

Both the FIG. 1 and FIG. 2 embodiments include a stack 30 of electrochemical cells which have been rolled into a "jelly-roll" construction. A representative cell 32 is shown in an expanded portion of FIGS. 1 and 2 at the right-hand side of stack 30. Each layer of the cells comprises two electrodes, a nickel oxide positive plate electrode 34 and a platinum (Pt) coated wire screen negative electrode 36.

A separator 38 is placed between the electrodes 34,36 to isolate them electrically from each other. The separator 38 may comprise any absorbent material, such as a fiberglass, polypropylene, Nylon or zirconia cloth, which has been soaked in an electrolyte, to provide a membrane between the two plates that is electrically insulating but is capable of passing charged ions, such as hydroxyl ions, therethrough.

The separator 38 may alternatively comprise a perfluorosulfonic acid ion exchange membrane, such as NAFION, manufactured by E. I. DuPont de Nemours Chemical Co., located in Wilmington, Del. An ion exchange member, such as NAFION permits ionic traversal of hydrogen protons, which are produced by ionization of hydrogen gas at the negative electrode, to the positive electrode where the protons combine with the hydroxyl ions in an electrochemical reaction. The use of NAFION as a membrane is described in U.S. Pat. No. 4,175,165, the disclosure of which patent is incorporated herein by reference.

An insulating sheet 40 is interposed between the electrodes of adjacent layers of the electrochemical cell 32 which have been rolled up into a jelly roll structure 30. The insulating sheet 40 is necessary to electrochemically separate the positive electrode 34 of one cell layer from the negative electrode 36 of an adjacent cell layer. Without the insulating sheet 40, a short circuit would be created between adjacent layers of the rolled up stack.

Each of the positive electrodes 34 are connected at appropriate points to a positive tab 42. Tab 42 in turn is welded to a metal sealing disc 44 which extends across the opening 16 from one lateral edge 22 of the sealing plug 20 to the other. The disc 44 provides a rigid support for the elastomeric plug 20 and to extend the lateral edge 22 within the annular space defined by the undulation 19 and the lip 18 of the case 12. The sealing disc 44 is also connected to the positive terminal 14 by welding or other appropriate means at the lateral edges to provide an enclosed space 45 between them.

The negative electrodes 36 are also connected at the opposite end of the case 12 to a negative tab 48 at appropriate positions, and the negative tab 48 is in turn connected to the casing 12 which is the negative terminal of the battery systems 10, 110. During battery operation, the negative tab 48 collects electrical current and feeds it to the casing 12, from whence it is connected to a load (not shown) which uses the electrical power outside of the battery, and a corresponding connection to the positive terminal 14.

The structure of the electrochemical cells 32 and the rolled up cell structure 30 reflects known cell constructions. Of course, other cell constructions are possible, including stacked cell constructions made according to aforementioned U.S. Pat. No. 5,419,981 or to U.S. Pat. No. 4,159,367. The significant features of this invention require that the cell stack provide passageways for easy communication of the hydrogen gas to the negative electrodes. Modifications to the cell stack structure may be made without departing from the invention, such as providing a negative plate having a different "wet proof" catalyst for hydrogen dissociation other than platinum, or even providing a metal hydroxide other than nickel hydroxide in the cathode, such as a manganese or silver oxide, MnO or AgO, respectively, as well as others.

The embodiment illustrated in FIG. 1 further includes elements which are different from those illustrated in FIG. 2 such as an isolated and separated hydrogen storage vessel 50 which is separated from the hydrogen battery within the steel casing 12 that is in fluid communication therewith through piping or conduit 52. Conduit 52 may be connected to the battery cell construction 30 in fluid communication through the aperture 26 in the cover plate 14. The conduit 52 may provide access to the space 45 between the cover plate 14 and the disc 44. Hydrogen fluid communication from the space 45 to the battery cell stack may be provided by a series of apertures through the elements between the cell stack and the cover plate including the covering disc 56, the metal sealing disc 44, and the positive tab 42. The hydrogen may freely communicate with each of the negative electrodes in the cell stack by grooves or other apertures which permit the hydrogen gas to flow longitudinally from the top end of the electrode stack toward the bottom through each of the layers of the battery cell stack construction 40.

The conduit 52 is enclosed construction which is sealed fluid-tight to the construction of the closed case 12 and is also fluid-tight sealed to the hydrogen storage vessel 50. Interposed within the fluid stream between the battery cells 30 and the hydrogen storage material 60.

The hydrogen storage vessel 50 is also an enclosed vessel such as a metal canister 62 having an opening 64 through which the conduit 52 extends. The conduit 52 is fluid-tight sealed to the opening 64 such that hydrogen gas is not permitted to leak out of this enclosed system.

Within the canister 62 is a metal hydride material 60. The metal hydride material may be any of a known number of metal hydrides which are capable of absorbing copious amounts of hydrogen gas within the interstitial structure such as lanthanum nickel (LaNi$_5$). Other hydride forming material such as iron, titanium, magnesium, calcium, nickel or Mischmetal calcium nickel may be used as is known in the art.

One or more longitudinally disposed springs 66 may be extending through the hydrogen storage vessel for providing easy communication of hydrogen from the opening 64 throughout the hydrogen hydride bed 60. Such springs are described in U.S. Pat. No. 4,396,114 issued to the inventor of the present invention. These springs sometimes referred to as Garter springs, comprise helical structures having an internal conduit for hydrogen flow but which can enter the hydride bed through the openings of the spring. The spring is tight enough such that the hydride does not enter into the conduit created by the spring. Adjacent the opening and between the opening 64 and the hydride bed 60 is a filter 70 which is capable of providing hydrogen flow therethrough and which inhibits the oxygen and water vapor from the hydrogen stream reaching the hydride 60. The electrolytic reaction in the hydrogen cell stack 30 may comprise a number of various media which will be described below but the essential feature of the material is that hydrogen flow is not impeded because of its size and inhibits oxygen and water vapor flow through the membrane so that water or oxygen do not reach or react with the material of the metal hydride bed 60. A shutoff valve 58 may be used to selectively open and close hydrogen communication to open or restrict hydrogen gas flow between the cells and the hydride material 60 in the hydride chamber 50.

The hydrogen screen filter 70 provides a means for filtering out impurities from the hydrogen stream before it reaches the metal hydride 60. It is shown in FIG. 1 as being disposed within the enclosure provided by the hydride cahmber 50 toward the wall having the opening 64. However, the filter 70 may be disposed anywhere in the path of the hydrogen stream from the electrochemical cell stack 30 to the metal hydride 60. For example, an alternative site for the membrane 70 may be within the chamber 45 which would permit any water vapor within the system to be maintained within the enclosure of the nickel case 12. When in a discharge state, the hydrogen flowing from the canister 50 and into the electrochemical cell stack 30 would necessarily have to traverse a path across the filter 70 so as to filter out any oxygen, water vapor or other impurities. Another location for the filter may be within the conduit 52.

The material of the filter 70 may comprise any of a number of known purifying materials. Examples may comprise a thin palladium disc which is of a thickness to be porous to hydrogen gas, or a pressed disc of nickel ballasted hydride alloy which would absorb the oxygen and/or water vapor and also absorb a sufficient portion of the hydrogen but still be porous to the remainder of the hydrogen stream. These metallic discs would necessarily have to have a thickness that is thin enough so they would be porous to hydrogen. Other materials for a filter can comprise a laminated disc of microporous tetrafluoroethylene and fluorinated ethylene-propylene resins, also known as GORE-TEX, manufactured by W. L. Gore & Associates, Inc. or a disc or encapsulation of the metal hydride with a rubber or latex thin film that would be impervious to oxygen or water vapor but would be porous to hydrogen gas.

Another material which may be possible to use as a filter would be a thin layer of nickel or copper which is deposited over the individual grains of metal hydride material which is then pressed into a form for insertion into the metal hydride storage vessel 50. Control of the thickness provides an efficient filter due to the vast increase in the surface area of the filter membrane which results from the smaller particles that are being encapsulated by the filter media. This type of microencapsulation of the metal hydride particles has been suggested in Koller et al U.S. Pat. No. 5,128,219. Koller et al suggests that a thin metal covering, preferably comprised of palladium, nickel or copper metal which would ensure good operability of the hydrogen storing electrode and protecting the electrode against oxidative destructure for a significant period of time. The same type of thin film metal covering may be used on metal hydride particles which are used only to store the hydrogen gas as opposed to storing them in an electrode for use in a battery cell. Palladium, nickel or copper are good candidates for such a metal covering because of the high specific proton conductivity and the high specific solubility for hydrogen.

Still another candidate and possibly a preferable candidate for a coating of the metal hydride surface area may be complete wetting of the hydride material with an inert water vapor-proof fluid such as organosiloxanes, commonly known as silicone oil. Studies have indicated that dimethylsilicone rubber provides good permeability for hydrogen gas while inhibiting the permeability of oxygen, carbon dioxide, water vapor and other larger molecules. A silicone oil or silicone rubber coating on the metal hydride surface area would be advantageous in that hydrogen passing through the silicone would be absorbed by the hydride while leaving water vapor on the surface of the metal hydride. Upon exiting from the hydride, the hydrogen gas stream would absorb the water vapor which has condensed on the surface of the silicone oil before it returns to the electromechanical cell.

Referring now only to FIG. 2, and the detail of the FIG. 2 embodiment illustrated in FIG. 3, an enclosed, segmented hydride battery system 110 includes a metal hydride containing hydrogen storage vessel 150 which is disposed within the containment can 12 and within the "jelly roll" structure 30 of the stacked electrochemical cells. Modifications to the structure of the battery system 10 (FIG. 1) are necessary to accommodate the location of the segmented hydrogen storage within the containment can 12.

One modification is to provide an excess pressure relief in the event that excess hydrogen pressure builds up within the containment can because of accident or malfunction. The aperture 24 of cover 16 provides egress for the excess hydrogen which will bleed down the hydrogen pressure within the can 12 through a one-way pressure relief valve 128 disposed adjacent the aperture 24. A spring 130 provides an axial bias on the outside of relief valve 28 to maintain the position of the relief valve 128 closed until sufficient internal gas pressure develops within the containment can 12. When the pressure exceeds a predetermined threshold, which may be dependent on the force provided by spring 130, the relief valve 128 will tend to push against the load of the spring 130 to bleed down some of the hydrogen pressure buildup within the can 12.

The spring 130 provides the load on the relief valve 128 to push the relief valve against a flat portion of the intermediate seal disk 44, which preferably is attached or otherwise connected to the outer peripheral edge 22 of the cover 16. The peripheral edge of the intermediate seal disk 44 extends to a space between the lip 18 and the undulation 19 of the containment can 12. The edge itself is surrounded by and sealed against the lateral edge 22 of the elastomeric plug 20 so that an effective gas-tight seal is formed between the containment can 12, the plug 20 and the seal disk 44.

The sealing disk 44 and the cover 16 together define a circular space 45 within which the one-way relief valve 128 and the spring 130 are disposed. The sealing disc 44 further includes an aperture 140 which provides one-way gas communication to the interior of the can 12. The aperture 140 is covered by the relief valve 128 when the hydrogen gas pressure in the can 12 is not sufficient to open the relief valve 128.

The electrochemical cell stack 30 also takes an alternative shape to accommodate the internal placement of an enclosed hermetically sealed metal hydride containing hydrogen storage vessel 150 essentially comprising an enclosed tubular canister 150 having an aperture constriction 152 at an end thereof in which a valve 158 is disposed. The valve may be a solenoid valve for automatically opening and closing the communication between the inside of the hydrogen storage vessel 150 and the electrochemical cell stack 30.

As is seen in FIG. 3, the solenoid valve 158 operates electrically by means of a wire connection 160 extending through an aperture 162 of the vessel 150. The electrical leads 160 are hermetically sealed within the aperture 162 so no hydrogen gas can escape through the opening 162. The solenoid includes a plunger 164 which is capable of sealingly closing off the aperture constriction 152 of the vessel 150. The rest position of the plunger is within the opening 152 to block off hydrogen communication through the constriction 152. The spring 166 maintains that rest position within the constriction by applying an axial spring force on the plunger to hold it within the opening. Application of electrical power through the leads 162 activates the solenoid 168 and retracts the plunger 164 away from the constriction 152.

Retraction of the plunger provides a sufficient opening for hydrogen gas communication between a chamber 167 within the vessel 150 and the environment external to the vessel 150 which comprises the electrochemical cell stack 30. The solenoid provides selective opening or closing of the hydrogen gas communication to the battery and thereby the hydrogen can be isolated and stored effectively without presenting an unnecessary discharge problem.

Separating the chamber 167 from a second chamber 169 within the metal hydride containing hydrogen storing vessel 150 is a thin film membrane 170 which is porous to hydrogen gas but is relatively impervious to the passage of oxygen, water vapor and/or other large molecule gases. These materials may be identical to or similar to those materials discussed with relation to the thin film 70 in relation to FIG. 1 above. Preferably, the thin film 170 is also a silicone or silicone rubber material which is relatively impervious to large molecule passage but nevertheless would be porous to hydrogen gas molecules.

Within the chamber 169 is a metal hydride bed 172 which also may be any of the known metal hydrides such as lanthinum nickel, titanium iron and others as recounted above. A spring 176, similar to the spring 66 of the FIG. 1 embodiment, may be introduced within the hydride battery 172 to permit longitudinal hydrogen flow from the membrane 170 throughout the length of the tube forming the vessel 150.

Other alternatives for encasing the metal hydride particles within a film which is impervious to larger gas molecules but porous to hydrogen may be utilized. For example, a vessel 150 filled with metal hydride particles that have been coated with a metallic film, such as the one which is described in U.S. Pat. No. 5,128,219, will dispense with the need of having a secondary filter 170. Moreover, the increased surface area provided by each of the particles to the gas flowing therethrough would provide a greater porosity rate of the hydrogen through the hydride enclosing film.

Another alternative embodiment of enclosing the metal hydride is illustrated in FIGS. 4 and 5. FIGS. 4 and 5 illustrate a jelly roll structure 180 of a metal hydride material 182 which has been coated with a film of material 184 that is porous to hydrogen and relatively impervious to larger gas molecules. The advantage of such a jelly roll structure is that a greater surface area per hydride rate is provided for greater porosity of the hydrogen gas to the metal hydride bed 182. Porosity rates have been studied of various materials, and it has been determined that greater surface area would permit more hydrogen to pass through the film 184 than it would permit other larger molecules to traverse into the metal hydride bed 182.

Still another embodiment of this invention is shown in FIG. 6 which illustrates a convoluted film structure 190 having a silicone membrane 192 and a second nylon membrane 194 between which is encased a metal hydride material 196. Convolutions 195 in the two membranes provide a much greater surface area for the ingress of hydrogen gas through the silicone membrane. The nylon membrane is impervious to the hydrogen as well as to other gases.

Either of the structures shown in FIGS. 4, 5, and 6 can be inserted within a tubular structure such as that indicated by either of the hydrogen storage vessels 50, 150 as shown in the FIGS. 1 and FIGS. 2-3 embodiments described above. The advantage of having such structures is that they will provide a much greater surface area for hydrogen permeability into the hydride bed 182,196, respectively, and thereby provide for quick, efficient and easy ingress and egress of the hydrogen from and to the hydride bed.

Of course, hydrogen gas ingress and egress is also controlled by the valves 58,158 which maintain the hydrogen isolated from the battery cells until the battery is ready for use. The efficacy of a valve such as valve 58,158 is described in U.S. Pat. No. 5,250,368, which has been incorporated by reference herein. The battery thus has a much longer shelf life and self-discharge of the battery is avoided.

Further modifications and other various changes in the details, materials and arrangement of parts which have been described and illustrated herein in explanation of the nature of this invention may be made by those of ordinary skill in the art. The illustrations and description of the embodiments described in this invention are illustrative only and are not limited except by the following claims.

What is claimed is:

1. A segmented metal hydride battery system comprising:
    a) a containment can;
    b) a stack of hydrogen-metal oxide cells, defining a hydrogen-metal oxide battery, disposed within the containment can, each-said cell comprising at least a positive and a negative electrode;
    c) a hermetically enclosed hydrogen storage vessel containing a metal hydride material for retaining and storing a concentrated volume of hydrogen, said metal hydride material being capable of releasably absorbing and discharging gaseous hydrogen, and including an aperture in the vessel;
    d) a communication means disposed between said hydrogen-metal oxide battery, and the enclosed hydrogen storage vessel for permitting a reversible communication of a hydrogen gas stream flow between them;
    e) a means for selectively opening and closing said communication means to permit and restrict hydrogen gas flow between the hydrogen battery and the enclosed hydrogen storage vessel; and
    f) a filter comprising a thin film material disposed in the hydrogen gas stream flow between the hydrogen battery and the enclosed metal hydride material, the filter being capable of diffusing hydrogen therethrough but being essentially impervious to oxygen, carbon dioxide and water vapor, said filter providing an effective enclosure for inhibiting oxygen, carbon dioxide and water vapor from reaching the metal hydride, hydrogen storage material.

2. The segmented metal hydride battery system according to claim 1, wherein said enclosed hydrogen storage vessel is disposed within said containment can.

3. The segmented metal hydride battery system according to claim 2 wherein said hydrogen vessel aperture further comprises an aperture constriction disposed in the hydrogen storage vessel.

4. The segmented metal hydride battery system according to claim 3 wherein said means for selectively opening and closing said communication means further comprises an automatic electrically operable plunger valve disposed in said constriction aperture.

5. The segmented metal hydride battery system according to claim 1 wherein said enclosed hydrogen storage vessel is disposed externally of said containment can.

6. The segmented metal hydride battery system according to claim 5 wherein said communication means comprises a conduit sealed to said hydrogen storage vessel aperture and to an aperture in said containment can.

7. The segmented metal hydride battery system according to claim 6 wherein said means for selectively opening and closing said communication means further comprises an automatic electrically operable plunger valve.

8. The segmented metal hydride battery system according to claim 1 wherein said hydrogen storage vessel further comprises a gas distribution means disposed within said metal hydride to provide even access of gaseous hydrogen throughout the material.

9. The segmented metal hydride battery system according to claim 8 wherein said gas distribution means comprises a garter spring having at least one opening disposed adjacent a hydrogen gas flow intake aperture of the hydrogen storage vessel.

10. The segmented metal hydride battery system according to claim 8 wherein said gas distribution means comprises the metal hydride material having a jelly roll structure, said structure comprising a thin layer of metal hydride material being coated on all surfaces with a thin film of a material that is porous to hydrogen and relatively impervious to the passage of larger molecules, the structure further being rolled up into a jelly roll and disposed within said hydrogen storage vessel so that a longitudinal end of said jelly roll structure is disposed adjacent a hydrogen gas flow intake associated with said hydrogen storage vessel aperture.

11. The segmented metal hydride battery system according to claim 8 wherein said gas distribution means comprises the metal hydride material having an annular structure comprising a thin layer of metal hydride material being coated on all surfaces with a thin film of a material that is porous to hydrogen and relatively impervious to the passage of larger molecules, the structure further including convolutions disposed adjacent neighboring convolutions and the convolutions being wrapped around a longitudinal axis into an annular ring, the annular ring being disposed within said hydrogen storage vessel so that a longitudinal end of said annular ring structure is disposed adjacent a hydrogen gas flow intake associated with said hydrogen storage vessel aperture.

12. The segmented metal hydride battery system according to claim 1 wherein said filter further comprises a thin palladium disc having a thickness permitting the filter to be porous to hydrogen gas.

13. The segmented metal hydride battery system according to claim 1 wherein said filter further comprises a pressed disc of nickel ballasted hydride alloy having a thickness permitting the filter to be porous to hydrogen gas.

14. The segmented metal hydride battery system according to claim 1 wherein said filter further comprises a laminated disc taken from a group consisting of microporous tetrafluoroethylene resins, fluorinated ethylene-propylene resins, silicone oil, silicone rubber, rubber thin film and latex thin film.

15. The segmented metal hydride battery system according to claim 1 wherein metal hydride material further comprises minute particles and said filter further comprises a thin film coating over and enclosing each of the metal hydride particles, said coating material taken from one or more of the group consisting of organosilaxanes, silicone rubber, palladium, nickel and copper.

16. The segmented metal hydride battery system according to claim 15 wherein filter material further comprises dimethylsilicone rubber.

17. The segmented metal hydride battery system according to claim 1 wherein said filter is disposed within said hydrogen storage vessel between the hydrogen storage vessel aperture and the metal hydride material.

18. The segmented metal hydride battery system according to claim 6 wherein said filter is disposed within said containment can between the containment can aperture and the hydrogen-metal oxide battery.

19. The segmented metal hydride battery system according to claim 6 wherein said filter is disposed within said conduit between said containment can and said hydrogen storage vessel.

* * * * *